United States Patent [19]

Moss

[11] 4,124,115
[45] Nov. 7, 1978

[54] CONVEYER SYSTEM

[76] Inventor: Norman W. Moss, 215 S. 11th Ave., Suite D, Yakima, Wash. 98902

[21] Appl. No.: 359,298

[22] Filed: May 11, 1973

[51] Int. Cl.² ............................................. B65G 49/00
[52] U.S. Cl. .................................................. 198/630
[58] Field of Search ........................... 198/1, 193, 198; 104/155

[56] References Cited

U.S. PATENT DOCUMENTS

| 2,514,429 | 7/1950 | Waugh | 198/198 |
| 3,327,832 | 6/1967 | Kyle | 198/1 |
| 3,687,083 | 8/1972 | Brown | 104/155 |

Primary Examiner—Evon C. Blunk
Assistant Examiner—Joseph E. Valenza

[57] ABSTRACT

The conveyer system comprises a conveyer trough, a pneumatic cell, and a conveyer surface. The conveyer surface may be laminated to the pneumatic cell, and may include a multiplicity of distally, parallelly, transversely disposed ribs.

2 Claims, 3 Drawing Figures

U.S. Patent  Nov. 7, 1978  4,124,115
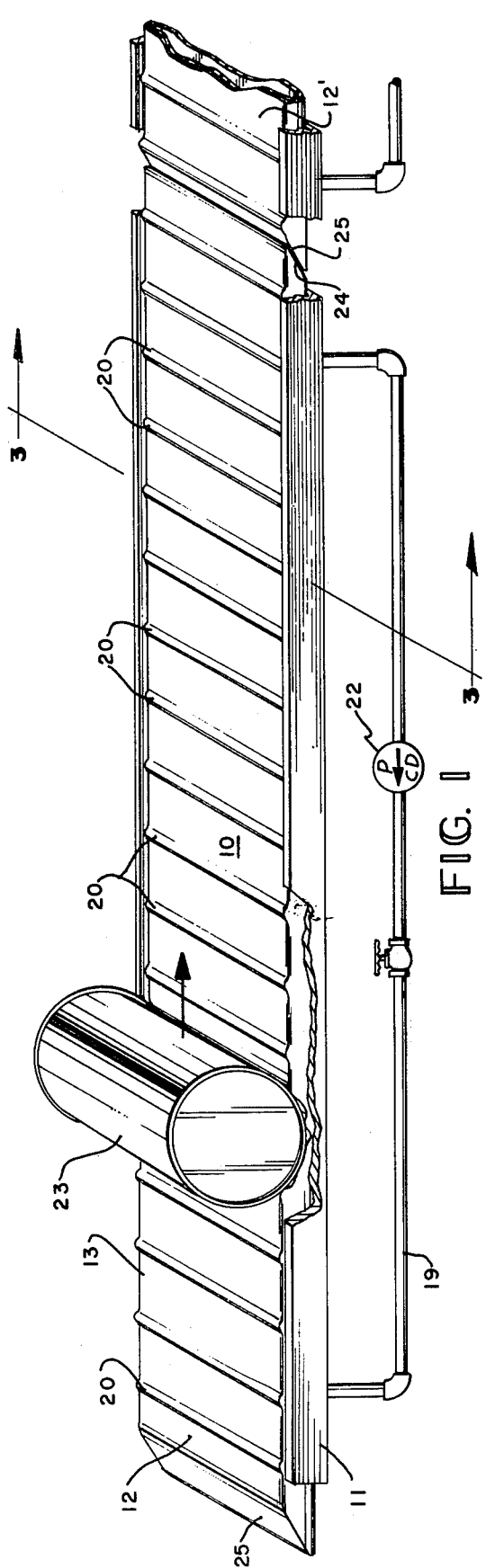
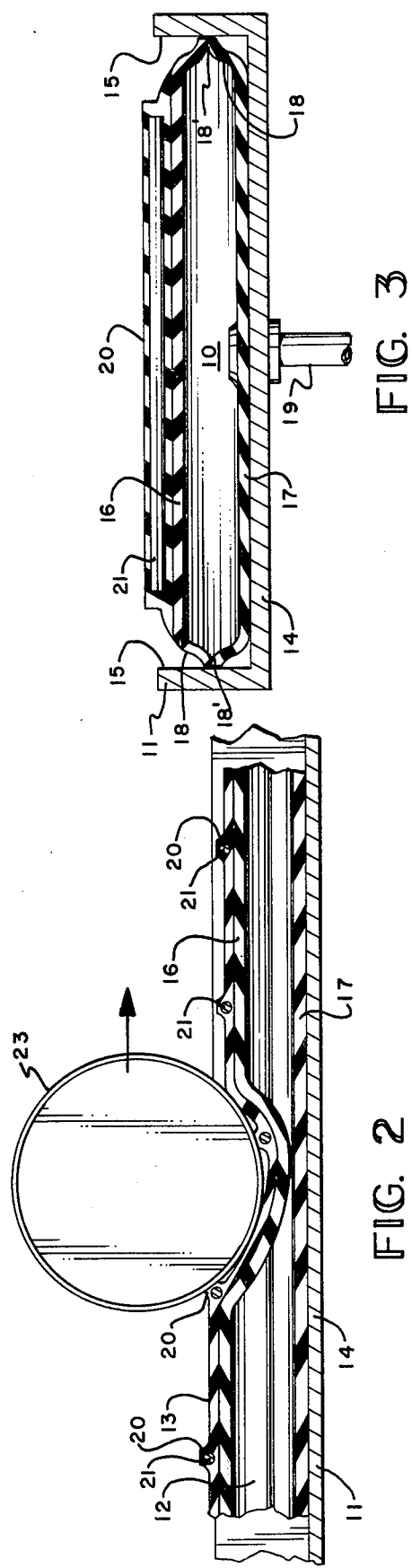

CONVEYER SYSTEM

FIELD OF INVENTION

The present invention relates to material handling apparatus and, more particularly, to conveyer belts and beds having pneumatic carrying and urging means.

DESCRIPTION OF THE PRIOR ART

Conveyer belts, commonly used and employed, include continuous belts and chains which are driven in a circuit over idler rollers and sprockets by a drive means. Trestles supporting the frameworks for carrying the conveyors and drive means may entail structures which are complex and costly to fabricate, to operate, and to maintain. A corollary apparatus for material handling includes conveyor beds which generally include means for frictionlessly carrying objects. These conveyer beds may include rollers or frictionless table surfaces. Conveyer beds must be fabricated and maintained with care to provide a downwardly inclined plane over the universe of the conveyer travel. It is widely recognized that trestles for carrying either conveyer belts or conveyer beds must distribute loads created by these operating apparatus. Such trestles must uniformly support the conveyer at all points along its line of travel.

Accordingly, it is an object of the present invention to provide a pneumatic conveyer system.

It is a further object of this invention to provide a multiplicity of distally, parallelly, tranversely disposed ribs along the conveyer surface to urge and control objects carried thereon.

It is a further object of this invention to provide support means for this conveyer system to uniformly support and to distribute loads generated.

These and other objects shall become apparent from the description following, it being understood that modifications may be made without affecting the teachings of the invention here set out.

SUMMARY OF THE INVENTION

Generally, thy conveyer system comprises a conveyer trough, a pneumatic cell, and a conveyer surface. The conveyer surface may be laminated to the pneumatic cell, and may include a multiplicity of distally, parallelly, transversely disposed ribs.

A more thorough and comprehensive understanding may be had from the detailed description of the preferred embodiment when read in connection with the drawings forming a part of this specification.

BRIEF DESCRIPTION OF THE DRAWINGS

FIG. 1 is a side elevational oblique view of the improved conveyer system of this invention including a cylindrical object for illustrative purposes.

FIG. 2 is a fragmentary side elevational view of the conveyer drawn to a larger scale with its exterior walls removed for illustrative purposes.

FIG. 3 is a cross-sectional view taken substantially along the lines 3—3 of the FIG. 1.

DETAILED DESCRIPTION OF THE PREFERRED EMBODIMENT

Referring now to the drawings and more particularly to the FIGS. 1 and 2, the conveyer system of this invention is shown to advantage, and generally identified by the numeral 10. The conveyer system 10 comprises a conveyer trough 11, a pneumatic cell 12, and a conveyer surface layer 13.

Referring to the FIGS. 2 and 3, the conveyer trough 11 is intended to support the flexible walls of the pneumatic cell 12 and to distribute loads generated on the conveyer system 10 over a relatively large, predetermined, load-bearing surface. The conveyer trough 11 may comprise a flat bottom wall 14 and a pair of distally parallel, upstanding walls 15. It will be noted that the trough 11 results in a structure providing relatively high flotation of loads on the conveyer 10. The pneumatic cell 12 is carried within the walls 14 and 15 of the trough 11. The pneumatic cell 12 comprises a flexible, air-tight, bladder-like construction having a top wall 16, a bottom wall 17, and a pair of sidewalls 18, including a seam-like portion 18'. The pneumatic cell 12 may be fabricated of a suitable extruded or laminated polymeric material which is both flexible and resilient. As shown in the FIG. 3, pneumatic pressure may be supplied to the pneumatic cell 12 through a pressure-supply conduit 19 which is disposed through the bottom walls 14 and 17 of the trough and pneumatic cell 12, respectively. It is to be understood that, while a pneumatic cell 12 is described, other fluids may be employed, such as oil, water, and the like.

The conveyer surface layer 13 is intended to provide means for controlling movement over the conveyer system 10 by resiliently receding into the cell 12 in response to the weight of articles carried thereon. The conveyer surface layer 13 may be fabricated of a polymeric material which is laminated to the top wall 16 of the pneumatic cell 12. The conveyer surface layer 13 should be suitably fabricated to conform about an object, such as the cylindrical object 23, carried thereon, so as to urge an object in the direction of travel and to control forward roll due to inertia. This may be accomplished by coating the conveyer surface layer 13 with a soft polymeric material, such as polypropylene and the like. This also might be accomplished by fabricating the conveyer surface 13 of a multiplicity of adjacently, transversely disposed plates laminated to the flexible top wall 16 of the pneumatic cell 12. A multiplicity of distally, parallelly, transversely disposed ribs 20 may be fabricated onto the object-contracting side of the conveyer surface 13. The ribs 20 may be reinforced by reinforcing cores 21 disposed rectilinearly within the ribs 20.

Referring to the FIGS. 1 and 2, a pump 22 is connected to the pressure-supply conduit 19 to circulate pressure through the pneumatic cell 12 in a predetermined direction which corresponds to the direction of travel of an object 23 to be carried on the conveyer system 10. In operation, the object 23 is urged in the direction of travel, indicated by the directional arrows, by a high-pressure area which builds in the pneumatic cell 12 at the rearward side of the object 23, and by a low-pressure area to its forward side created by the pump 22 withdrawing pressure from the cell 12. It may be seen that the rate of travel of the object 23 may be determined by the amount of pressure behind the object 23. It is to be understood that, with modification of pressure, the object 23 could be urged along an upwardly inclined, a level, or a downwardly inclined plane by the conveyer system 10. It may also be seen that the ribs 20 are operable to provide forward urging means on the object 23, both forwardly and rearwardly of the object 23, tending to control forward roll due to inertia on the object 23.

Lengths of conveyer systems 10 may be coupled into longer lengths by aligning terminals ends of the cells 12 and 12' and operating continuously within a trough 11. It has been found to advantage to provide the cells 12 and 12' with closed, beveled ends in which one of the terminal ends is provided with a chamfer 24 on its lowermost side, while the end opposite has a chamfer 25 on its uppermost side. The chamfer 24 of the cell 12 may then be disposed in an overlapping manner with the chamfer 25 of the adjacent cell 12', resulting in a continuously supported conveyer means 10 made of sections which are convenient to assemble and to maintain. The beveled ends may also be used to combine speciality sections of the conveyer system 10, such as curves, with ordinary sections of the conveyer 10.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A conveyer system, comprising:
   means for supporting said conveyer system;
   a bladder-like pneumatic cell suitably disposed on said supporting means, and including a flexible resilient top wall, bottom wall, and a pair of opposing sidewalls;
   a conveyer surface layer disposed on the uppermost terminal side of said top wall fabricated in resiliently compress with said pneumatic cell, one of the terminal ends of said cell having a chamfer on its lowermost side, and wherein the end opposite of said cell has a chamfer on its uppermost side; and
   means for circulating pressure through said pneumatic cell in a selected direction of travel of said conveyer system.

2. The apparatus of claim 1 wherein said chamfer on the lowermost side of one cell may be disposed adjacently overlapping said chamfer of the uppermost side of another cell in said support means.

* * * * *